United States Patent
Mergenthaler et al.

(10) Patent No.: US 6,223,107 B1
(45) Date of Patent: Apr. 24, 2001

(54) METHOD AND DEVICE FOR MONITORING SENSORS IN A VEHICLE

(75) Inventors: Rolf-Hermann Mergenthaler, Leonberg; Werner Urban, Vaihingen/Enz, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/254,250

(22) PCT Filed: May 9, 1998

(86) PCT No.: PCT/DE98/01300

§ 371 Date: May 26, 1999

§ 102(e) Date: May 26, 1999

(87) PCT Pub. No.: WO99/01719

PCT Pub. Date: Jan. 14, 1999

(30) Foreign Application Priority Data

Jul. 2, 1997 (DE) .............................. 197 28 097
Oct. 31, 1997 (DE) .............................. 197 48 126

(51) Int. Cl.⁷ .................. G06F 7/00; G06F 19/00
(52) U.S. Cl. .................. 701/34; 701/41; 701/74; 701/75; 701/80; 303/146; 303/147
(58) Field of Search .................. 701/34, 41, 72, 701/75, 78, 80, 83, 74; 303/146, 147, 149, 148

(56) References Cited

U.S. PATENT DOCUMENTS

| | | | |
|---|---|---|---|
| 5,790,970 | * 8/1998 | Brachert et al. | 701/70 |
| 5,809,444 | * 9/1998 | Hadeler et al. | 701/72 |
| 5,832,402 | * 11/1998 | Brachert et al. | 701/72 |
| 5,842,143 | 11/1998 | Lohrenz et al. | |
| 5,987,364 | * 11/1999 | Le Gusquet et al. | 701/24 |

FOREIGN PATENT DOCUMENTS 196 36 443   3/1998 (DE) .
0 751 888    1/1997 (EP) .

* cited by examiner

Primary Examiner—William A. Cuchlinski, Jr.
Assistant Examiner—Gertrude Arthur
(74) Attorney, Agent, or Firm—Kenyon & Kenyon

(57) ABSTRACT

A device to monitor sensors in a motor vehicle, with the sensors generating signals, each representing different physical is provided. The device includes first arrangement with which identically defined comparison variables for the sensors are determined for at least two sensors on the basis of at least the signals generated by them. Furthermore, the device includes a second arrangement with which a reference variable is determined on the basis of at least two of the identically defined comparison variables and is taken into account in monitoring performed in a third arrangement for at least one sensor. To form the reference variable, a variable describing the difference between the identically defined comparison variable and the other identically defined comparison variables of the minimum of two identically defined comparison variables is determined for each of the minimum of two identically defined comparison variables. The identically defined comparison variable is evaluated using this variable.

8 Claims, 1 Drawing Sheet

1

METHOD AND DEVICE FOR MONITORING SENSORS IN A VEHICLE

FIELD OF THE INVENTION

The present invention relates to a device and a method for monitoring sensors used in a motor vehicle. In particular, the device and the method are intended for monitoring sensors used in a system for regulating the driving dynamics of a motor vehicle.

BACKGROUND INFORMATION

Devices and methods for monitoring sensors used in a vehicle are known from the related art in a variety of versions.

The patent application filed with the German Patent Office German Patent Application No. 196 36 443 describes a method and a device for monitoring sensors used in a vehicle. With this method and device, sensors each representing different physical parameters are monitored. The device contains means with which identically defined comparison variables are determined for at least two sensors, starting from at least the signals generated by them. The device also contains other means with which one reference variable is determined as a function of at least the determined comparison variables. A sensor reference variable is determined for each of the individual sensors on the basis of this reference variable. Taking into account the sensor reference variables, monitoring and/or correction is performed for each sensor. The above-mentioned patent application describes the following procedure for determining the reference variable.

On the basis of the identically defined comparison variables, a reference variable is determined by comparison of these comparison variables. To determine the reference variable, first the comparison variable having the greatest difference from the reference variable determined last is determined. Since this comparison variable has the greatest difference from the reference variable determined last, it can be concluded that under some circumstances the respective sensor might be defective. Consequently, this comparison variable is not taken into account in determining the instantaneous reference variable. The new reference variable is determined by forming a weighted average. First, the remaining comparison variables and second, the differences between the remaining comparison variables enter into the formation of the weighted average.

Systems for regulating the driving dynamics of a vehicle are described, for example, in the article "FDR—die Fahrdynamik-Regulung von Bosch (Regulating Drive Mechanics—the Bosch Method) published in the automotive engineering journal *Automobiltechnische Zeitschrift* (ATZ), volume 16, number 11 (1994) pages 674–689.

SUMMARY OF THE INVENTION

The object of the present invention is to improve upon the monitoring by sensors used in a vehicle.

This object is achieved by the features of claim 1 and by those of claim 7.

SUMMARY OF THE INVENTION

The present invention permits monitoring of sensors that generate signals, each representing a different physical variable. For at least two sensors, identically defined comparison variables are advantageously determined for the sensors on the basis of at least the signals they generate. A reference variable is advantageously determined on the basis of at least two of the identically defined comparison variables and is taken into account in monitoring at least one sensor.

To form the reference variable, a variable describing the difference between the identically defined comparison variable and the other identically defined comparison variables of the at least two identically defined comparison variables is advantageously determined for each of the at least two identically defined comparison variables. The identically defined comparison variable is evaluated using this variable.

It is of particular interest when the identically defined comparison variables determined represent a physical variable, preferably corresponding to a variable detected with one of the sensors installed in the vehicle, in particular a yaw rate.

A variable representing the vehicle speed is advantageously determined on the basis of some of the signals generated with the help of the sensors, each representing different physical variables. On the basis of the reference variable and this variable representing the vehicle speed, a sensor reference variable is determined for at least one sensor and is taken into account in monitoring the at least one sensor.

It is especially advantageous if the signal generated by at least one sensor is corrected for that sensor at least on the basis of its sensor reference variable and the signal generated by it.

For a vehicle having wheel rpm sensors, a rotational rate sensor or a yaw rate sensor, a transverse acceleration sensor and a steering angle sensor, the reference variable is advantageously determined as follows:

for the wheel rpm sensors, an identically defined comparison variable omeganij is determined at least on the basis of the variable representing the vehicle speed and the signals generated by it;

for the rotational rate sensor or yaw rate sensor, an identically defined comparison variable omegakorr is determined at least on the basis of the signal generated by it and its sensor reference variable;

for the transverse acceleration sensor, an identically defined comparison variable omegaay is determined at least on the basis of the signal generated by it, the variable representing the vehicle speed and its sensor reference variable;

for the steering angle sensor, an identically defined comparison variable omegadelta is determined at least on the basis of the signal generated by it, the variable representing the vehicle speed and its sensor reference variable, and the reference variable is determined according to the equation:

$$omegaref = \frac{\frac{omegakorr}{D12 \cdot D13 \cdot D14} + \frac{omegadelta}{D12 \cdot D23 \cdot D24} + \frac{omeganij}{D13 \cdot D23 \cdot D34} + \frac{omegaay}{D14 \cdot D24 \cdot D34}}{\frac{1}{D12 \cdot D13 \cdot D14} + \frac{1}{D12 \cdot D23 \cdot D24} + \frac{1}{D13 \cdot D23 \cdot D34} + \frac{1}{D14 \cdot D24 \cdot D34}}$$

where the terms:
D12=|omegakorr−omegadelta|, D13=|omegakoor= omeganij|, D14=|omegakoor−omegaay|, D23= |omegadelta−omeganij|, D24=|omegadelta−omegaay| and D34=|omeganij−omegaay| describe the differences between two identically defined comparison variables.

Another advantage of the method invention and the device according to the present is the sturdiness of the reference variable. Furthermore, the sensor reference variable does not exhibit any sudden changes.

Other advantageous embodiments of the present invention can be derived from the subclaims and the drawing.

DETAILED DESCRIPTION

Figure 1:
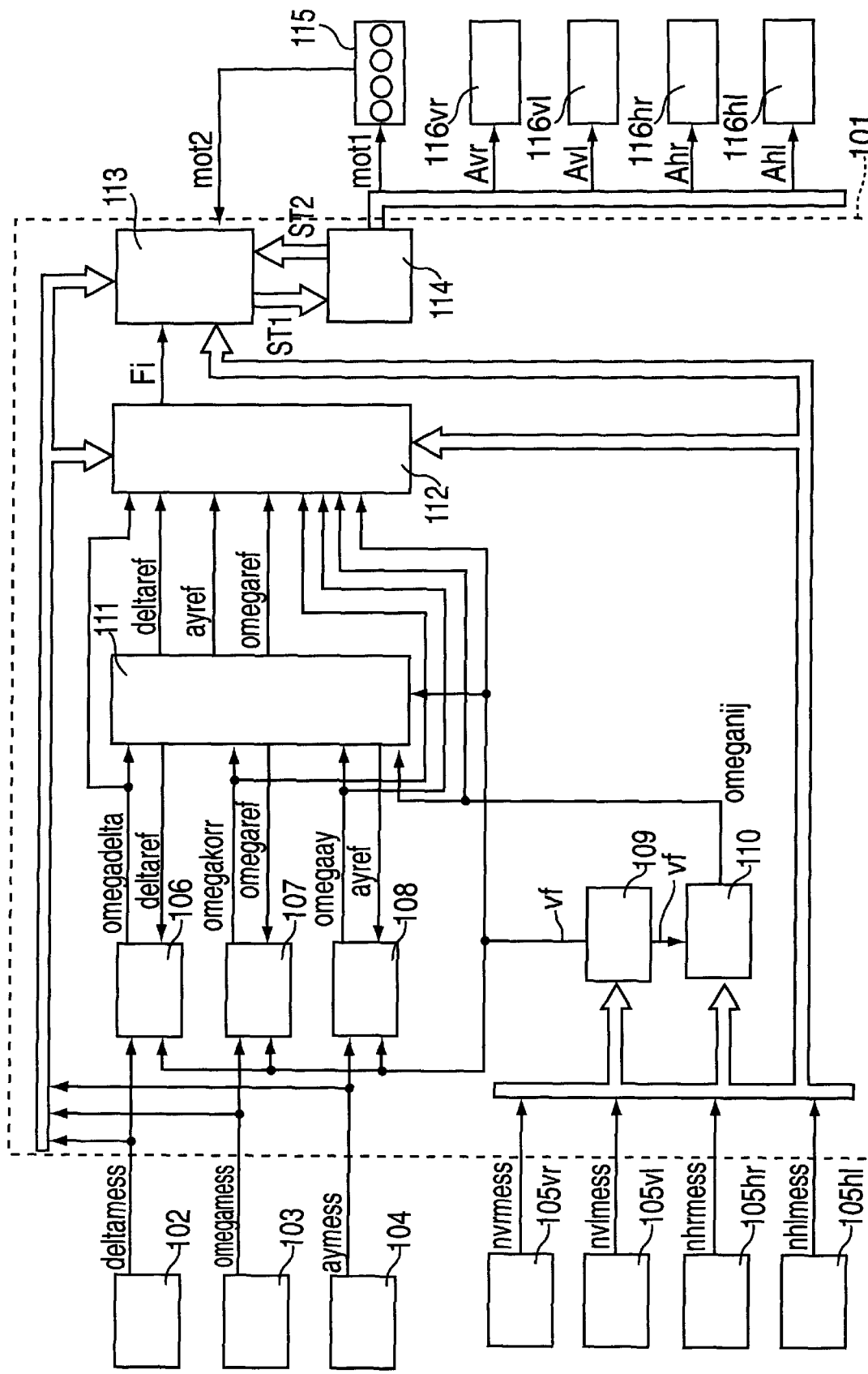
FIG. 1 illustrates a device for implementing a method according to the present invention.

The present invention will now be described with reference to FIG. 1.

The specific form of the embodiment selected—use of the device and the method according to the present invention in a system for regulating the driving dynamics of a vehicle—is not intended to represent a restriction of the present invention in any way.

In FIG. 1, block 101 shows a control unit which is used in the device according to the present invention to carry out the method according to the present invention.

A steering angle sensor 102 can detect a quantity deltamess that describes the steering angle set on the vehicle. Signal deltamess generated with the help of steering angle sensor 102 is sent to a block 106 as well as blocks 112 and/or 113. With the help of a rotational rate sensor or yaw rate sensor 103, a variable describing the yawing motion of the vehicle about its vertical axis is detected. Signal omegamess detected with the help of rotational rate sensor or yaw rate sensor 103 is sent to a block 107 as well as to blocks 112 and 114. With a transverse acceleration sensor 104, a variable describing the transverse acceleration acting on the vehicle is detected. Signal aymess generated with the help of transverse acceleration sensor 104 is sent to blocks 108, 112 and 114. Blocks 105$vr$, 105$vl$, 105$hr$ and 105$hl$ represent wheel rpm sensors assigned to the wheels of the vehicle. Simplified notation 105$ij$ is introduced below for the wheel rpm sensors. Index i indicates whether the wheel is on the rear axle (h) or on the front axle (v). Index j shows the assignment to the right (r) or left (l) side of the vehicle. This notation using two indices i and j is the same for all variables and components used here. Signals nijmess generated with the help of wheel rpm sensors 105$ij$ are sent to blocks 109, 110, 112 and 113.

On the basis of signals nijmess generated with wheel rpm sensors 105$ij$, a variable vf describing the vehicle speed is generated in a block 109. This variable vf describing the vehicle speed is sent from block 109 to blocks 106, 108, 110 and blocks 111 and 112. Optionally variable vf may also be sent to block 107.

Identically defined comparison variables are determined for sensors 102, 103, 104 and 105$ij$ in blocks 106, 107, 108 and 110. In the present embodiment, it is assumed that the comparison variables for the sensors represent a yaw rate as a physical variable.

In a block 106, an identically defined comparison variable omegadelta is determined on the basis of signal deltamess supplied to it as well as variable vf describing the vehicle speed and variable deltaref supplied to block 106. Identically defined comparison variable omegadelta is sent from block 106 to blocks 111 and 112. Identically defined comparison variable omegadelta is determined as follows, for example, in block 106:

First, an offset value for signal deltamess is determined on the basis of signal deltamess, variable vf describing the vehicle speed and a signal deltaref, which describes a reference value, known as the sensor reference variable, for the steering angle detected with the help of steering angle sensor 102. Signal deltaref is corrected on the basis of the offset value thus determined. Using the corrected signal, identically defined comparison variable omegadelta is determined with the help of a mathematical model, taking into account variable vf describing the vehicle speed.

Determination of identically defined comparison variable omegaay takes place in block 108 on the basis of signals aymess, vf and ayref supplied to it in accordance with the determination of identically defined comparison variable omegadelta in block 106. Identically defined comparison variable omegaay is sent to a block 111 as well as a block 112.

As described above, the identically defined comparison variables for the sensors represent a yaw rate as a physical variable, thus identically defined comparison variable omegakorr determined in block 107 corresponds to the offset-corrected signal omegamess, because in this case it is not necessary to convert the offset-corrected sensor signal to a yaw rate with the help of a mathematical model. As described above in conjunction with blocks 106 and 108, an offset value for signal omegamess is determined in block 107 on the basis of signal omegamess as well as variable omegaref. Identically defined comparison variable omegakorr is calculated from signal omegamess with the help of this offset value. Variable omegakorr is sent to a block 111 and a block 112.

For the case when the identically defined comparison variables for the sensors represent a variable other than the yaw rate as a physical variable, a conversion of the offset-corrected signal with the help of a mathematical model must also be performed in block 107. For this reason, variable vf describing the vehicle speed is shown as being supplied to block 107.

In a block 110, an identically defined comparison variable omeganij is determined for wheel rpm sensors 105$ij$ on the basis of signals nijmess generated with the help of wheel rpm sensors 105$ij$ as well as variable vf representing the vehicle speed. Identically defined comparison variable omeganij is sent from block 110 to blocks 111 and 112.

Two processes take place in block 111. First, a reference variable omegaref is determined in block 111 on the basis of identically defined comparison variables omegadelta, omegakorr, omegaay and omeganij supplied to the block.

A proposed method of determining the reference variable is by forming the following weighted mean:

$$omegaref = \frac{\frac{omegakorr}{D12 \cdot D13 \cdot D14} + \frac{omegadelta}{D12 \cdot D23 \cdot D24} + \frac{omeganij}{D13 \cdot D23 \cdot D34} + \frac{omegaay}{D14 \cdot D24 \cdot D34}}{\frac{1}{D12 \cdot D13 \cdot D14} + \frac{1}{D12 \cdot D23 \cdot D24} + \frac{1}{D13 \cdot D23 \cdot D34} + \frac{1}{D14 \cdot D24 \cdot D34}}$$

where $D12 = |omegakorr - omegadelta|$ (2), $D13 = |omegakorr - omeganij|$ (3), $D14 = |omegakorr - omegaay|$ (4), $D23 = |omegadelta - omeganij|$ (5), $$D24=|\text{omegadelta}-\text{omegaay}| \quad (6),$$

$$D34=|\text{omeganij}-\text{omegaay}| \quad (7).$$

As shown by equation (1) above, a variable describing the difference between this identically defined comparison variable and the other identically defined comparison variables is determined for each identically defined comparison variable.

The differences between variable omegakorr and variables omegadelta, omeganij and omegaay enter into the first term of the numerator formed with identically defined comparison variable omegakorr. The differences between variable omegadelta and variables omegakorr, omeganij and omegaay enter into the second term of the numerator formed with identically defined comparison variable omegadelta. The differences between variable omeganij and variables omegakorr, omegadelta and omegaay enter into the third term of the numerator formed with identically defined comparison variable omeganij. The differences between variable omegaay and variables omegakorr, omegadelta and omegnij enter into the fourth term of the numerator formed with identically defined comparison variable omegaay.

The weighting method according to the above formulation is selected so that when the identically defined comparison variables are equidistant in pairs, it yields exactly the arithmetic mean of these identically defined comparison variables. Furthermore, this ensures that when two of the four identically defined comparison variables coincide in the present embodiment, for example, reference variable omegaref will also assume this value.

Second, sensor reference variables for sensors 102, 103 and 104 are determined in block 111. These sensor reference variables are determined on the basis of reference variable omegaref and taking into account variable vf describing the vehicle speed with the help of various mathematical models. For sensor 102, the steering angle sensor, sensor reference variable deltaref is determined and sent from block 111 to block 106 and block 112. For sensor 103, the rotational rate sensor or yaw rate sensor, sensor reference variable omegaref is used and is sent from block 111 to block 107 and block 112. For sensor 104, the transverse acceleration sensor, sensor reference variable ayref is determined and is also sent from block 111 to block 108 and block 112. Determination of ayref takes place like the determination of deltaref.

Sensors 102, 103 and 104 are monitored in block 112 on the basis of sensor reference variables deltaref and ayref supplied to it, reference variable omegaref, identically defined comparison variables omegadelta, omegakorr, omegaay and omeganij and variable vf representing the vehicle speed. The result of this monitoring is output with the help of variable Fi and sent to block 113. Variable Fi contains information on whether the sensor is defective for each of the above-mentioned sensors. Monitoring for the individual sensors is performed on the basis of plausibility queries.

Block 113 is the regulator of control unit 101. Measurement signals deltamess, omegamess, aymess and nijmess are sent to block 113. Furthermore, block 113 receives from engine 115 a signal mot2 describing the engine rpm, for example. Furthermore, block 113 receives signals ST2 sent from a block 114, which is the control logic for actuators 116ij and the engine. These signals may be, for example, control times Aij of actuators 116ij, which are designed as brakes in particular. On the basis of the measurement signals and signals ST2 and taking into account variable Fi, regulator 113 determines, in accordance with the control it implements, signals ST1 which are sent to control logic 114. Formation of signals ST1 can be modified if regulator 113 is notified by signal Fi that one of sensors 102, 103 or 104 is defective.

In block 114, a control signal mot1 for engine 115 and control signals Aij for actuators 116ij are determined on the basis of signals ST1 supplied to that block. Regulation of a motion variable representing the motion of the vehicle is implemented through the corresponding control of engine 115 and actuators 116ij, which are designed as brakes in particular. With signals ST2 generated in block 114, the status of actuators 116ij, for example, is relayed to regulator 113.

What is claimed is:

1. A device for monitoring a least one of a plurality of sensors in a motor vehicle, the sensors generating signals, each of the signals representing a different physical variable, comprising:

a first arrangement determining identically defined comparison variables for at least two of the sensors as a function of the signals generated by the at least two of the sensors;

a second arrangement determining a reference variable as a function of at least two of the identically defined comparison variables, the reference variable being determined as a function of a variable describing a difference between each one of the at least two of the identically defined comparison variables and the others of the at least two of the identically defined comparison variables, the one of the at least two of the identically defined comparison variables being weighted by the variable describing the difference; and a third arrangement monitoring the at least one of the sensors as function of the reference variable.

2. The device according to claim 1, wherein the identically defined comparison variables represent a physical variable, the physical variable corresponding to a yaw rate detected by one of the sensors.

3. The device according to claim 1, wherein a vehicle speed variable representing vehicle speed is determined as a function of the signals generated by the sensors, a sensor reference variable being determined for the at least one of the sensors as a function of the vehicle speed variable, the sensor reference variable being used to monitor the at least one of the sensors.

4. The device according to claim 3, wherein the signals generated by the at least one of the sensors is corrected as a function of the sensor reference variable and the signals generated.

5. The device according to claim 1, wherein the sensors include wheel rpm sensors, one of a rotational rate sensor and yaw rate sensor, a transverse acceleration sensor, and a steering angle sensor.

6. The device according to claim 1, wherein a vehicle speed variable representing vehicle speed is determined as a function of the signals generated by the sensors, a sensor reference variable being determined for the at least one of the sensors as a function of the vehicle speed variable and the reference variable, the sensor reference variable being used to monitor the at least one of the sensors.

7. A device for monitoring a least one of a plurality of sensors in a motor vehicle, the sensors generating signals, each of the signals representing a different physical variable, comprising:

a first arrangement determining identically defined comparison variables for at least two of the sensors as a function of the signals generated by the at least two of the sensors;

a second arrangement determining a reference variable as a function of at least two of the identically defined comparison variables, the reference variable being determined as a function of a variable describing a difference between each one of the at least two of the identically defined comparison variables and the others of the at least two of the identically defined comparison variables, the one of the at least two of the identically defined comparison variables being weighted by the variable describing the difference; and a third arrangement monitoring the at least one of the sensors as function of the reference variable, wherein:

a first one of the identically defined comparison variables is omeganij and is determined for wheel rpm sensors as a function of a variable representing vehicle speed and the signals generated by the wheel rpm sensors;

a second one of the identically defined comparison variables is omegakorr and is determined for one of a rotational rate sensor and a yaw rate sensor as a function of at least the signals generated by the one of the rotational rate sensor and the yaw rate sensor, and a sensor reference variable for the one of the rotational rate sensor and the yaw rate sensor;

a third one of the identically defined comparison variables is omegaay and is determined for a transverse acceleration sensor as a function of at least the signals generated by the transverse acceleration sensor, the variable representing vehicle speed, and a sensor reference variable for the transverse acceleration sensor;

a fourth one of the identically defined comparison variables is omegadelta and is determined for a steering angle sensor as a function of at least the signals generated by the steering angle sensor, the variable representing vehicle speed, and a sensor reference variable for the steering angle sensor; and the reference variable is determined according to the equation:

$$omegaref = \frac{\frac{omegakorr}{D12 \cdot D13 \cdot D14} + \frac{omegadelta}{D12 \cdot D23 \cdot D24} + \frac{omeganij}{D13 \cdot D23 \cdot D34} + \frac{omegaay}{D14 \cdot D24 \cdot D34}}{\frac{1}{D12 \cdot D13 \cdot D14} + \frac{1}{D12 \cdot D23 \cdot D24} + \frac{1}{D13 \cdot D23 \cdot D34} + \frac{1}{D14 \cdot D24 \cdot D34}}$$

where the terms:

D12=|omegakorr−omegadelta|, D13=|omegakoor−omeganij|, D14=|omegakoor−omegaay|, D23=|omegadelta−omeganij|, D24=|omegadelta−omegaay| and D34=|omeganij−omegaay| describe the difference between each of the at least two identically defined comparison variables and the others of the at least two identically defined comparison variables.

8. A method of monitoring sensors in a vehicle, comprising the steps of:

generating signals via the sensors, each of the signals representing different physical variables;

determining identically defined comparison variables for at least two of the sensors as a function of the signals generated by the at least two of the sensors;

determining a reference variable as a function of at least two of the identically defined comparison variables, the reference variable being determined as a function of a difference between each of the at least two identically defined comparison variable and the others of the at least two identically defined comparison variables; and monitoring at least one of the sensors using the reference variable.

* * * * *